United States Patent [19]

Person et al.

[11] E Patent Number: Re. 33,520

[45] Reissued Date of Patent: Jan. 15, 1991

[54] DOT MATRIX PLASMA DISPLAY AND METHOD FOR DRIVING SAME

[75] Inventors: Herman R. Person; Joseph F. Hesse; Steven R. Hall, all of Columbus, Nebr.

[73] Assignee: Dale Electronics, Inc., Columbus, Nebr.

[21] Appl. No.: 263,780

[22] Filed: Oct. 26, 1988

Related U.S. Patent Documents

Reissue of:

[64] Patent No.: 4,450,441
Issued: May 22, 1984
Appl. No.: 296,790
Filed: Aug. 27, 1981

[51] Int. Cl.[5] ..... G09G 3/28

[52] U.S. Cl. ..... 340/773; 340/771; 315/169.4

[58] Field of Search ..... 340/713, 714, 758, 769, 340/771, 773, 774, 779; 315/169.1, 169.4

[56] References Cited

U.S. PATENT DOCUMENTS

| | | | |
|---|---|---|---|
| 3,499,167 | 3/1970 | Baker et al. . | |
| 3,863,090 | 1/1975 | Pennebaker et al. | 313/217 |
| 4,027,195 | 5/1977 | Shutoh et al. | 340/771 X |
| 4,031,429 | 6/1977 | Holz et al. | 340/771 |
| 4,035,689 | 7/1977 | Ogle et al. . | |
| 4,047,077 | 9/1977 | Veith | 315/169.4 |
| 4,109,176 | 8/1978 | Ernsthausen et al. . | |
| 4,121,256 | 10/1978 | Lorteije et al. | 340/771 X |
| 4,200,868 | 4/1980 | Lamoureux et al. | 340/771 X |
| 4,205,392 | 5/1980 | Byrom et al. . | |
| 4,214,183 | 7/1980 | Ernsthausen . | |
| 4,218,632 | 8/1980 | Ernsthausen et al. . | |
| 4,247,856 | 1/1981 | Fumeron | 340/771 |
| 4,253,044 | 2/1981 | Smith | 315/169.4 |
| 4,292,631 | 9/1981 | Gerard | 340/771 |
| 4,296,357 | 10/1981 | Hirayama et al. . | |

FOREIGN PATENT DOCUMENTS

| | | |
|---|---|---|
| 1809896 | 7/1969 | Fed. Rep. of Germany . |
| 2256528 | 6/1973 | Fed. Rep. of Germany . |
| 48-90469 | 11/1973 | Japan . |
| 53-118365 | 10/1978 | Japan . |
| 56-73840 | 11/1979 | Japan . |
| 1289971 | 9/1972 | United Kingdom . |
| 1317221 | 5/1973 | United Kingdom . |
| 1336729 | 11/1973 | United Kingdom . |
| 1404897 | 9/1975 | United Kingdom . |
| 1479779 | 7/1977 | United Kingdom . |
| 1480459 | 7/1977 | United Kingdom . |
| 1489017 | 10/1977 | United Kingdom . |
| 1554958 | 10/1979 | United Kingdom . |

*Primary Examiner*—Jeffery A. Brier
*Attorney, Agent, or Firm*—Zarley, McKee, Thomte, Voorhees & Sease

[57] ABSTRACT

The dot matrix plasma display of the present invention comprises a plurality of parallel cathode strips mounted on the upper surface of a dielectric substrate. A glass plate is sealingly engaged over the upper surface of the substrate in spaced relation thereto so as to form an envelope therebetween. The undersurface of the glass plate includes a plurality of anode strips which extend in a direction parallel to one another and perpendicular to the cathode strips located on the substrate below. A dielectric film is printed over the cathode strips and includes a plurality of apertures therein which correspond to the junctures between the anode strips and the cathode strips, these junctures forming a dot matrix. Ionizable gas is contained within the envelope and is adapted to glow adjacent the junctures of any simultaneously actuated anode and cathode strips.

The method for driving the dot matrix plasma display includes actuating the cathode strips one at a time sequentially. Simultaneously with the actuation of each cathode strip, a pre-selected combination of anodes are also actuated so as to cause the gas to glow adjacent the junctures between the actuated anodes and cathode strips. The cathode strips are scanned at a frequency which to the human eye gives the appearance that they are constantly actuated.

12 Claims, 2 Drawing Sheets

DOT MATRIX PLASMA DISPLAY AND METHOD FOR DRIVING SAME

Matter enclosed in heavy brackets [ ] appears in the original patent but forms no part of this reissue specification; matter printed in italics indicates the additions made by reissue.

BACKGROUND OF THE INVENTION

This invention relates to a dot matrix plasma display and method for driving the same.

Heretofore there have been two primary methods for displaying characters on a plasma display. The most commonly used method is the segment method, which includes either seven or sixteen segments, each of which includes a cathode and an anode, separated by an ionizable gas such as neon. The actuation of the anode and cathode of each element causes illumination of the ionizable gas adjacent the element. It is thus possible to create various numerals and/or letters by actuating the desired combination of segments.

Another method for displaying characters deals with the dot matrix approach as opposed to the segment approach. The dot matrix utilizes a series of rows and columns of dots which can be actuated in the desired combination to create the letters, numerals or other characters desired. One presently known method for actuating the dot matrix devices utilizes a glow transfer technique which requires many layers of small, thin conductor lines separated by many printings of dielectric. Another technique utilizes a plurality of dots in each character, and each dot of one character is interconnected to a corresponding dot in a second character. This technique requires many prints of dielectric in layers over a plurality of small conductor lines.

The presently known dot matrix devices are capable of being driven by rather simple driving circuits. However, the devices themselves are expensive to make and include a plurality of layers of dielectric and conductor lines.

Therefore, a primary object of the present invention is the provision of an improved dot matrix plasma display and method for driving the same.

A further object of the present invention is the provision of a device which minimizes the printing operations and the layers of dielectric and conductors in the device.

A further object of the present invention is the provision of a device which is less expensive to manufacture than devices previously known.

A further object of the present invention is the provision of a device which is simple in construction and which may at the same time be driven by simple and inexpensive circuitry.

A further object of the present invention is the provision of a device which is economical to manufacture, durable in use and efficient in operation.

SUMMARY OF THE INVENTION

The present invention utilizes a dot matrix plasma display which has a rectangular array of cells or dots formed by horizontal cathode strips and vertical anode strips. The dots are formed by the junctures or crossing points between the horizontal cathode strips and the vertical anode strips. The cathode strips are covered with a dielectric which confines the glow area to the exposed portion of the cathode, which in this case is a small circle or dot. The dots are located at the junctures between the cathode and anode strips. By applying voltage between the cathode and the anode of a dot or cell, it is possible to illuminate the gas which is located adjacent this juncture. The anode is transparent, and therefore the illumination is visible through the anode.

The method for driving the dot matrix display involves illuminating one row of dots at a time. That is, one cathode strip is actuated and simultaneously a predetermined selected group of anodes is also actuated. This causes a gas glow adjacent the junctures between the actuated anodes and the single actuated cathode strip. After the first cathode strip has been actuated, all the cathodes and anodes are turned off for a short interval. Then a second cathode is actuated and the anodes of a second selected combination are also actuated so as to cause gas glow at the desired dots in the second row. This procedure is continued until all the rows of the cathodes have been actuated. The process is recycled at a frequency which is not perceptible to the human eye. The result is that the human eye perceives all of the actuated dots as though they were glowing continuously.

It is desirable to scan the cathodes one at a time rather than the anodes. The cathodes extend in a direction which represents the greatest length of the rectangular dot matrix. This is because the cathode is usually made from a good electrical conductor and therefore a minimum voltage drop is encountered across the length of the cathode strip. In contrast, the anode strips run the short dimension of the dot matrix because these anode strips are made of a poor conductor and a greater voltage drop occurs over any given length of the anode strip.

A relatively large number of cathode strips can be scanned fast enough to not be perceptible to the human eye. It is believed that approximately 60 cathode strips can be scanned fast enough that the human eye perceives a continuous glow. Because there are 60 rows to be scanned, a small pulse width is unavoidable during the actuation of each individual row. Although the pulse width should be kept as large as possible, some techniques to insure quick ionization of the gas are highly desirable. This is accomplished by use of a keep alive, which is a separate anode-cathode cell that acts much in the nature of a pilot light to prime the ions within the dot matrix envelope. Thus, when each cell is actuated, the time for ionization of the gas adjacent that cell is minimized due to the priming created by the keep alive cell. Keep alives are generally covered with an opaque anode and therefore are not visible.

DETAILED DESCRIPTION OF THE INVENTION

Figure 1:
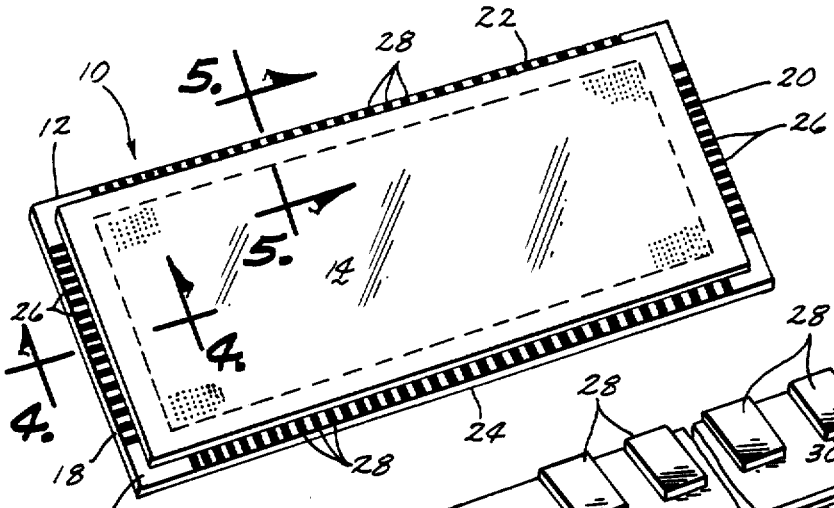
FIG. 1 is a perspective view of the dot matrix display device of the present invention.

The numeral 10 generally designates the dot matrix plasma display unit shown in FIG. 1. Display device 10 includes a glass substrate 12 and a glass top plate 14. The dimensions of plate 14 are slightly less than the dimensions of plate 12 so as to expose a perimetric strip 16 around the outside edge or perimeter of the top surface of plate 12.

Plate 12 includes opposite side edges 18, 20, a top edge 22 and a bottom edge 24. Mounted on perimetric strip 16 on the upper surface of plate 12 are a plurality of cathode pads 26 which are positioned adjacent side edges 18, 20 of substrate 12. A plurality of anode pads, 28 are mounted adjacent the top and bottom edges 22, 24 of substrate 12.

Figure 2:
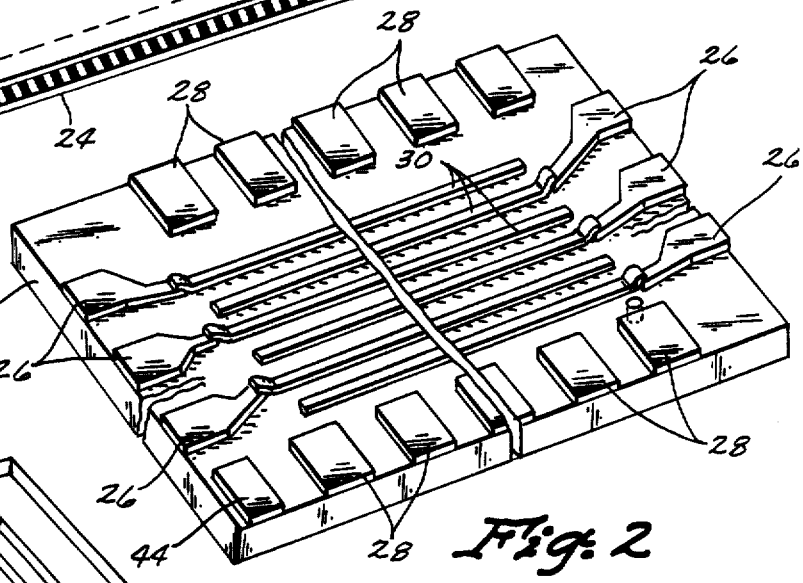
FIG. 2 is a perspective view of a simplified version of the dot matrix display device showing the substrate with the first printed circuit thereon.

FIG. 2 illustrates a simplified version of the device shown in FIG. 1, and therefore corresponding numerals will be utilized to indicate corresponding parts. In the usual application of the invention, however, there may be as many as 64 or more cathode pads and over 160 anode pads on the particular device.

Printed on the upper surface of substrate 12 are a plurality of cathode strips or bars 30, each of which is elongated and straight. Cathode bars 30 are parallel to one another and spaced from one another. Each cathode bar 30 is in electrical contact with a cathode pad 26.

Figure 3:
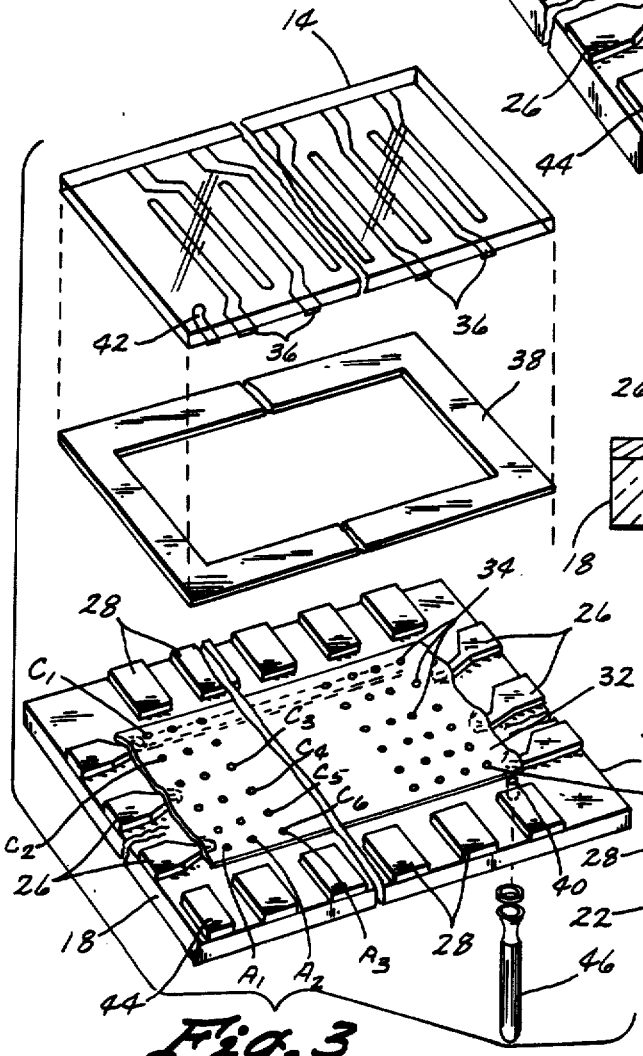
FIG. 3 is an exploded perspective view of the simplified device shown in FIG. 2.

Referring to FIG. 3, dielectric printed layer 32 is printed over cathode strips 30. Layer 32 includes a plurality of holes or dots 34 therein which expose portions of the cathode strips 30 therebelow. Dots 34 are arranged in a matrix of horizontal rows C1–C6 and vertical columns A1–A12. Each row C1–C6 is in registered alignment over one of the cathode strips 30 and exposes a portion thereof through each dot 34.

Figure 4:
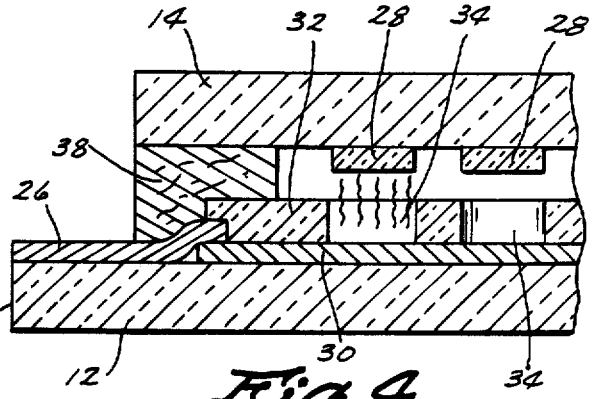
FIGS. 4 and 5 are sectional views taken along lines 4—4 and 5—5 of FIG. 1.

A plurality of anode strips 36 are etched or printed on the undersurface of glass plate 14. These anode strips are transparent electrical conductors. Plate 14 is attached to plate 12 by means of a sealing paste 38, extending around the perimeter of plate 14. Paste 38 hermetically seals plate 14 in spaced relation above plate 12 so as to create an envelope therebetween. When plate 14 is in position, each one of anode strips 36 is in registered alignment over one of the anode dot columns A1–A12. Thus, each dot 34 is positioned at the junctures of the parallel anodes 36 and the parallel cathode strips 30. This can be readily seen in FIG. 4. Electrical contact between each anode strip 36 and its corresponding anode pad 28 is provided by an electrically conductive epoxy 48 (FIG. 5) which is injected by means of a hypodermic needle.

The method of fabrication is as follows: Glass substrate 12 is made up of ⅛ inch float glass, cut to an appropriate size depending upon the particular style of display being constructed. Glass substrate 12 is then drilled with a water cooled ultrasonic drill for the purpose of providing an evacuation/fill orifice 40 therein.

A thick film printing process is then used to provide the various insulating and conductive film inks on the substrate. First, a silver thick film composition manufactured by duPont under the product designation 7713 is printed onto the glass substrate to define pads 26, 28. These pads located around the periphery of the substrate serve two purposes. First, they provide a conductive path from the exterior of the display to its interior and second, they provide a means by which an electrical/mechanical connection can be made to the device. The printed pads are permitted to dry in the air and then are fired at approximately 585° C. in a kiln.

Next, a conductor of nickel film manufactured by duPont under the product designation 9535 is printed onto the substrate to define the cathode bars or strips 30. The cathode bars are in parallel lines and preferably have dimensions of 0.010 inches to 0.020 inches in width and from one inch to eight inches in length. They are approximately 20 to 50 microns in thickness.

The cathode bars 30 may run either horizontally or vertically depending upon how it is desired to drive the display. However, it is preferred that the cathode bars extend the longest dimension of the device because they are made of a highly conductive material, whereas the anodes, being made of a transparent conductor exhibit a much greater resistance, and consequently a greater voltage drop over a given linear distance.

After the cathode bars have been permitted to dry and are fired in a 585° C. kiln, a dielectric layer 32 is printed thereon. The material for the dielectric layer is preferably a thick film dielectric composition manufactured by duPont under the product designation 9541. It is printed onto the substrate to define the individual cathode dots 34 running along the cathode bars 30. The dots may be from 0.010 to 0.020 inches in diameter. Other dielectric compounds which can be used for the insulating sheet are Electro-Science 4023B and 4028B.

The dots may be of several arrangements: (1) a solid array of dots commonly referred to as an XY array. Such an array may have many dimensions suitable to the geometry and design of the display. (2) Dots. grouped together to form characters. Such characters usually consist of an array of dots, five dots by seven dots in height. An additional row of dots may provide an underbar or cursor as desired. Other suitable arrangements include an array of seven dots by nine dots, or any other array desired by the end user. The dielectric layer, in addition to defining the cathode dots, provides an insulating layer which covers those portions of the cathode bar not wanted to be lighted up when the display is being operated.

The next step in the manufacture of the device is to print the sealing paste 38 about the periphery of the dielectric sheet for purposes of forming a hermetic seal for the envelope. This material forms a raised wall enclosing the dielectric sheet, and this raised wall has a thickness of from 0.010 inches to 0.030 inches. The printed material may be preglazed in either a box oven or a kiln with a peak temperature of 500° C. for approximately ten minutes. After the glazing process, the substrate is ready for the sealing operation. While waiting for the sealing operation, the substrate is stored in a dry nitrogen atmosphere during the preparation of the cover plates 14.

The glass cover 14 is made up of one-eighth float glass which has a transparent tin oxide layer deposited on one side. The cover glass is available from Pittsburgh Plate Glass Company under the trade designation "NESA" with resistivities down to 80 ohms per square, with a tolerance of plus or minus 50%. Other sources of tin oxide coated glass include Photon Power, Inc. which produces glass having resistivities of 8–12 ohms per square. It is of importance that the tin oxide coating be as close as possible to 100% free of scratches for obtaining a completely workable display. One should be very careful to avoid fingerprinting the glass inasmuch as fingerprints can interfere with the acid etching which occurs later.

The tin oxide coated covers are then carefully printed with an etch resist material which is printed in a pattern defining the tin oxide anodes which will be formed in the ultimate product. Several screen printable etch resist compositions are available commercially and are well known in the art. The etch resist printing is dried at 100° C. for approximately ten minutes and then is ready for the acid etching.

Acid etching is accomplished by immersing the coating in a warm acid bath. First, a solution of zinc metal powder and deionized water is printed onto the coated side of the plate. The glass cover is then immersed in a heated mixture of one part deionized water to one part of 50% hydrochloric acid. For best results, the temperature of this acid bath should be between 39° and 55° C. The glass covers should remain in the acid bath for no longer than 15 to 20 seconds inasmuch as longer periods of time result in undercutting of the etch resist which is not desired. After the recommended time period, the glass cover is removed from the acid bath and immersed in a rinse of plain deionized water. After being permitted to dry, the glass covers will be fully and properly etched with only the tin oxide coating for anodes 36 present.

The etch resistant coating is then removed by means of a 6% caustic soda solution slightly warmed. After this the glass is immersed in an alcohol deionized water bath and gently wiped dry. The etched pattern will be a series of straight parallel transparent conductors 36.

The glass cover next receives a print of duPont 9535 nickel conductive composition for the purpose of forming keep alive covers if they are warranted. In FIG. 3, a keep alive cover 42 is shown printed on the undersurface of plate 14 and is adapted to be connected to keep alive pad 44.

The glass cover 14 is now ready to be joined to the glass substrate 12 for purposes of forming a hermetic seal. The glass cover is positioned over the substrate and with the array of tin oxide anodes being orthogonal to the cathode bars and being in careful alignment with the columns A1–A12 of dots in dielectric 34.

Once the glass cover is aligned properly over the substrate 12, clamps are applied to hold it in place. Then a fill tubulation 46 is positioned over the evacuation and fill orifice 40. The fill tubulation is generally manufactured from glass and has a thermal coefficient which matches with the glass substrate 12.

The assembly is then set into an oven and heated to 480°–500° C., which causes the sealing glass 38 to be reheated and remelted so as to flow together and form a hermetic seal. The sealing glass for the fill tubulation also melts and forms a hermetic seal at the fill tubulation substrate junction. After five to 30 minutes, the hermetic seal is completed and the unit is "slowly cooled down to room temperature".

A small glass capsule containing mercury is then dropped down the tubulation so as to provide means to introduce mercury to the display later. The purpose of the mercury is to retard the cathode sputtering which occurs in the plasma when the gas discharge is initiated. An alternative method to the mercury capsule is the use of a mercury giver ring or pill which is commercially available.

The display is then attached to a high vacuum pump for purposes of pumping out all the air. The envelope is then filled with a Penning mixture of 99.5% neon gas, 0.5% argon gas, and a trace of Krypton-85 radio active gas. Backfill pressure should typically be 150–700 millimeters mercury, depending upon the display design. The unit is then sealed off by heating the fill tubulation at a point about two to three inches from the lower surface of the substrate 12. This softens the glass and allows the fill tubulation to collapse. When fully collapsed, the unit may be pulled away, causing the softened portion of the tubulation to separate. The Penning mixture is then sealed inside the display.

The mercury capsule is then burst by use of an infrared gun and the unit is placed in a 300°–350° C. oven for purposes of moving the mercury into the display. The remainder of the fill tubulation is then cut off just above the point where it is attached to the substrate which is usually approximately one-half inch from the substrate.

Figure 5:
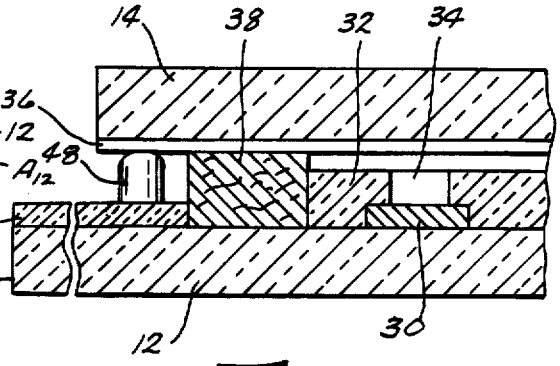

Completion of the unit is accomplished by injecting conductive epoxy between the outer edges of the anode strips 36 and the anode pads A1–A12. As shown in FIG. 5, the conductive epoxy 48 forms an electrical connection between anode strips 36 and anode pads 28. This epoxy is injected by means of a needle such as a hypodermic needle, and the nodules 48 are formed adjacent each of the pads 28.

Figure 6:
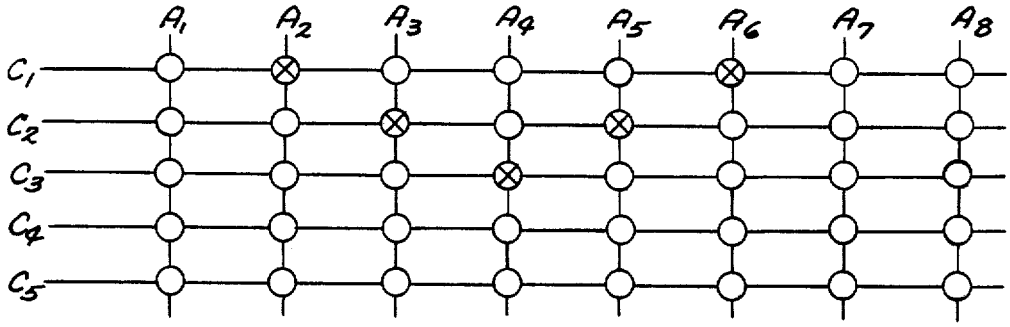
FIG. 6 is a schematic view of a dot matrix configuration having four cathode strips and eight anode strips.
Figure 7:
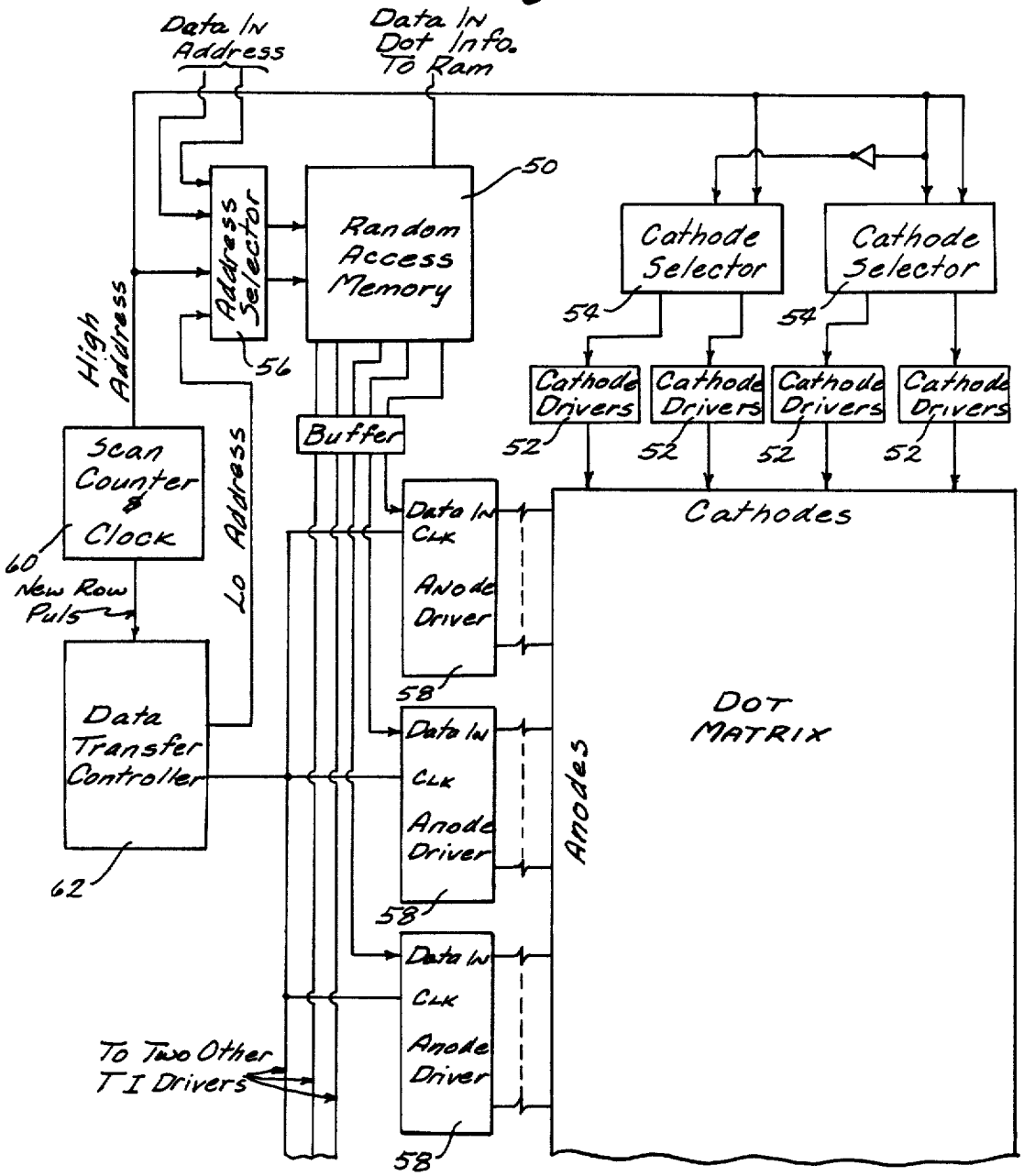
FIG. 7 is a schematic view of the driving circuit utilized with the dot matrix display of the present invention.

FIGS. 6 and 7 demonstrate the means and method for driving the dot matrix display 10 shown in FIGS. 1–5.

FIG. 6 illustrates a schematic view of the anode strips A1–A8 and cathode strips C1–C4. The dots 34 are located at the junctures of the anode and cathode strips. For purposes of illustration, the junctures between C1–A2, C2–A3, C3–A4, C2–A5, and C1–A6, are shown actuated. The method of the present invention contemplates actuating the cathode strips one at a time in sequential fashion while at the same time actuating different combinations of the anode strips to create the desired result. In the examples shown in FIG. 6, the initial step of the scanning process involves actuating cathode C1. At the same time, anodes A2 and A6 are actuated so that the junctures between cathodes C1 and anodes A2 and A6 are actuated to create a gas glow. All the cathodes and anodes are then turned off for a short period, and then cathode C2 is actuated. Simultaneously with the actuation of cathode C2, anodes A3 and A5 are actuated. Next, cathode C3 is actuated and at the same time, anode A4 is actuated. Finally, cathode C4 is actuated, but none of the anodes are actuated. The cycle then repeats itself at a frequency which cannot be perceived by the human eye. Thus, to the human eye, the glows which occur at C1–A2, C2–A3, C3–A4, C2–A5 and C1–A6 all appear to be glowing continuously.

FIG. 7 shows the circuitry which can be utilized to practice the method described above. Initially the data pertaining to the character desired to be displayed is inserted in a random access memory unit designated by the numeral 50. Unit 50 stores the information pertaining to the character to be displayed. The actuation of the cathode is initiated by cathode driving circuits 52. Each driver 52 drives eight cathode strips, and the particular cathode strip being driven is controlled by the cathode selector 54.

Initially cathode selector 54 causes cathode driving circuits 52 to actuate the first cathode strip. Simultaneously the address transmitted to the cathode selector is transmitted to the address selector designated by the numeral 56. Address selector 56 then causes preselected signals to be issued from the random access memory. These signals contain the information as to which particular anodes should be actuated for the first cathode. This information is transmitted to the anode drivers designated by the numeral 58. Each anode driver 58 includes a clock input which is controlled by scan counter clock 60 and by the data transfer controller 62 so that the information from the random access memory is stored within each of the anode drivers 58. When all the information pertaining to the first cathode is stored in the anode drivers 58, the anode drivers 58 and the cathode driver 52 simultaneously actuate the first cathode and the particular preselected anodes which are desired to be actuated with the first cathode. This causes gas discharge glow adjacent the junctures between the actuated anodes and the first cathode. The scan counter and clock 60 then shuts off the cathodes and anodes and steps to a new address pertaining to the second cathode and to the combination of anodes which should be actuated with respect to that cathode. The address is transmitted to the random access memory 50 and the information is again inserted into anode drivers 58. Then anode drivers 58 and cathode drivers 52 are again actuated so that the second cathode is actuated and a second combination of anodes is also actuated. This process continues stepping through the cycle until all the cathodes and the anodes corresponding thereto have been actuated. The process repeats itself at a frequency which is not perceptible to the human eye, and the resulting effect is that the human eye perceives all of the gas discharge glows as being continuous, rather than intermittant.

The particular circuitry shown in FIG. 7 is illustrative of a circuit which can be used to produce the method of applicant's invention. Other circuitry could be used also without detracting from the invention. Listed below are an identification of the various components shown in the schematic diagram of FIG. 7.

| Component | Manufacturer Name and Address | Part Number |
|---|---|---|
| Cathode driver 52 | Sprague Electric Worcester, Mass. | ULN 2823A |
| Cathode Selector | RCA New York, N.Y. | CD 4514 BE |
| Address Selector 56 | Texas Instrument Dallas, Texas | SN 74157N |
| Random Access Memory 50 | National Semi-Conductor Santa Clara, C.A. | MM2102 |
| Anode Driver 58 | Texas Instruments Dallas, Texas | SN 75501A |

What is claimed is:

1. A direct current dot matrix digital display device comprising:

a dielectric substrate having a flat upper surface, a plurality of elongated cathode strips mounted on the upper surface of said substrate and being arranged in parallel spaced relation to one another, a printed dielectric layer on said substrate and said cathode strips and having a plurality of openings therethrough each communicating with a portion of said cathode strips, said openings being formed in rows and columns to form a matrix, [and] *said* rows of openings each being aligned over one of said [cathod] *cathode* strips, a transparent top plate having an under surface and sealed to the perimeter of said substrate by sealing means and positioned above and in spaced relation to said dielectric layer to create an envelope of space above, in communication with, and completely enveloping said matrix of openings;

a plurality of elongated anode strips mounted on the undersurface of said top plate within said envelope of space and in spaced relation to said dielectric layer, said anode strips extending perpendicular and above said cathode strips and each being spaced above and in registered alignment with one of said columns in said matrix of openings in said dielectric layer, a mass of ionizable gas filling said envelope of space and said matrix of openings in said dielectric layer whereby said anode strips are all in direct contact with said mass of ionizable gas, said dielectric layer covering all portions of said cathode strips and said upper surface of said substrate within said envelope between said matrix of openings;

said anode strips and said cathode strips being the only electrodes positioned in alignment with said matrix of openings, said envelope being substantially free of barriers between said rows and column of openings, and terminal means for said anode and cathode strips.

2. A device according to claim 1 wherein said sealing means holds said top plate and said substrate spaced apart from one another a distance from 0.010 inches to 0.030 inches.

3. A device according to claim 1 wherein said ionizable gas within said envelope is under a pressure between 150 and 700 millimeters mercury.

4. A direct current dot matrix digital display device, comprising:

a dielectric substrate having a flat upper surface, a plurality of elongated cathode strips mounted on the upper surface of said substrate and being arranged in parallel spaced relation to one another, a printed dielectric layer on said substrate and said cathode strips and having a plurality of openings therethrough each communicating with a portion of said cathode strips, said openings being formed in rows and columns to form a matrix, said rows of openings each being aligned over one of said cathode strips, a transparent top plate having an under surface and sealed to the perimeter of said substrate by sealing means and positioned above and in spaced relation to said dielectric layer to create an envelope of space above, in communication with, and completely enveloping said matrix of openings;

a plurality of elongated anode strips mounted on the undersurface of said top plate within said envelope of space and in spaced relation to said dielectric layer, said anode strips extending perpendicular to the above said cathode strips and each being spaced above and in registered alignment with one of said columns in said matrix of openings in said dielectric layer, said anode strips and said cathode strips being the only electrodes positioned in alignment with said matrix of openings, said envelope being substantially free of barriers between said rows and columns of openings, terminal means for said anode and cathode strips;

anode driving means connected to said anode strips for actuating said anode strips;

cathode driving means connected to said cathode strips for actuating said cathode strips;

random access memory means for storing information as to the selected anode strips and cathode strips to be actuated;

data transfer circuitry for intermittently transmitting data signals from said random access memory means to said anode and cathode driving means, said anode and cathode driving means being responsive to receipt of each of said data signals to cause first, a simultaneous actuation of one of said cathode strips and a corresponding group of said anode strips for causing a glow at those of said openings in said matrix which are located at the intersection of said actuated cathode and anode strips, and second, a complete deactuation of all of said cathode and anode strips for causing a cessation of glow; each of said signals causing simultaneous actuation of a different cathode strip and a different group of anode strips;

control means connected to said data transfer means for causing said data transfer means to transfer data signals one at a time from said random access memory means for actuating each of said cathodes and a corresponding group of anodes one at a time in a sequence which permits all of said cathode strips to be actuated and then for repeating said sequences of signals at a frequency imperceptible to the human eye whereby the intermittent glow from said actuated anode and cathode strips will appear to be continuous.

5. A direct current dot matrix digital display device comprising:

a dielectric substrate having a flat upper surface, a plurality of elongated cathode strips mounted on the upper surface of said substrate and being arranged in parallel spaced relation to one another, a printed dielectric layer on said substrate and said cathode strips and having a plurality of openings therethrough each communicating with a portion of said cathode strips, said openings being formed in rows and columns to form a matrix, said rows of openings each being aligned over one of said cathode strips, a transparent top plate having an under surface and sealed to the perimeter of said substrate by sealing means and positioned above and in spaced relation to said dielectric layer to create an envelope of space above, in communication with, and completely enveloping said matrix of openings;

a plurality of elongated anode strips mounted on the undersurface of said top plate within said envelope of space and in spaced relation to said dielectric layer, said anode strips extending perpendicular to and above said cathode strips and each being spaced above and in registered alignment with one of said columns in said matrix of openings in said dielectric layer.

a mass of ionizable gas filling said envelope of space and said matrix of openings in said dielectric layer whereby said anode strips are all in direct contact with said mass of ionizable gas.

said anode strips and said cathode strips being the only electrodes positioned in alignment with said matrix of openings, said envelope being substantially free of barriers between said rows and column of openings, and terminal means for said anode and cathode strips;

said terminal means comprising a plurality of anode pads and a plurality of cathode pads mounted on said substrate, and connection means connected to each of said anode strips and extending from each of said anode strips into electrical connection with one of said anode pads on said substrate.

6. A direct current dot matrix digital display device comprising:

a dielectric substrate having a flat upper surface, a plurality of elongated cathode strips mounted on the upper surface of said substrate and being arranged in parallel spaced relation to one another, a printed dielectric layer on said substrate and said cathode strips and having a plurality of openings therethrough each communicating with a portion of said cathode strips, said openings being formed in rows and columns to form a matrix, said rows of openings each being aligned over one of said cathode strips, a transparent top plate having an under surface and sealed to the perimeter of said substrate by sealing means and positioned above and in spaced relation to said dielectric layer to create an envelope of space above, in communication with, and completely enveloping said matrix of openings;

a plurality of elongated anode strips mounted on the undersurface of said top plate within said envelope of space and in spaced relation to said dielectric layer, said anode strips extending perpendicular to and above said cathode strips and each being spaced above and in registered alignment with one of said columns in said matrix of openings in said dielectric layer, a mass of ionizable gas filling said envelope of space and said matrix of openings in said dielectric layer whereby said anode strips are all in direct contact with said mass of ionizable gas, said anode strips and said cathode strips being the only electrodes positioned in alignment with said matrix of openings, said envelope being substantially free of barriers between said rows and column of openings, and terminal means for said anode and cathode strips;

said ionizable gas within said envelope being under a pressure between 150 and 700 millimeter mercury.

7. A direct current dot matrix digital display device comprising:

a dielectric substrate having a flat upper surface, a plurality of elongated cathode strips mounted on the upper surface of said substrate and being arranged in parallel spaced relation to one another, a printed dielectric layer on said substrate and said cathode strips and having a plurality of openings therethrough each communicating with a portion of said cathode strips, said openings being formed in rows and columns to form a matrix, said rows of openings each being aligned over one of said cathode strips, a transparent top plate having an under surface and sealed to the perimeter of said substrate by sealing means and positioned above and in spaced relation to said dielectric layer to create an envelope of space above, in communication with, and completely enveloping said matrix of openings;

a plurality of elongated anode strips mounted on the undersurface of said top plate within said envelope of space and in spaced relation to said dielectric layer, said anode strips extending perpendicular to and above said cathode strips and each being spaced above and in registered alignment with one of said columns in said matrix of openings in said dielectric layer, a mass of ionizable gas filling said envelope of space and said matrix of openings in said dielectric layer whereby said anode strips are all in direct contact with said mass of ionizable gas, said anode strips and said cathode strips being the only electrodes positioned in alignment with said matrix of openings, said envelope being substantially free of barriers between said rows and column of openings, and terminal means for said anode and cathode strips;

said envelope having mercury introduced therein for retarding sputtering of said cathodes.

8. A direct current dot matrix digital display device comprising:

a dielectric substrate having a flat upper surface, a plurality of elongated cathode strips mounted on the upper surface of said substrate and being arranged in parallel spaced relation to one another, a printed dielectric layer on said substrate and said cathode strips and having a plurality of openings therethrough each communicating with a portion of said cathode strips, said openings being formed in rows and columns to form a matrix, said rows of openings each being aligned over one of said cathode strips, a transparent top plate having an under surface and sealed to the perimeter of said substrate by sealing means and positioned above and in spaced relation to said dielectric layer to create an envelope of space above, in communication with, and completely enveloping said matrix of openings;

a plurality of elongated anode strips mounted on the undersurface of said top plate within said envelope of space and in spaced relation to said dielectric layer, said anode strips extending perpendicular to and above said cathode strips and each being spaced above and in registered alignment with one of said columns in said matrix of openings in said dielectric layer, a mass of ionizable gas filling said envelope of space and said matrix of openings in said dielectric layer whereby said anode strips are all in direct contact with said mass of ionizable gas, said anode strips and said cathode strips being the only electrodes positioned in alignment with said matrix of openings, said envelope being substantially free of barriers between said rows and columns of openings, and terminal means for said anode and cathode strips;

keep alive means within said envelope comprising an opaque keep alive anode on said undersurface of said top plate and a keep alive cathode on said uppersurface of said substrate.

9. A direct current dot matrix digital display device comprising:

a dielectric substrate having a flat upper surface, a plurality of elongated cathode strips mounted on the upper surface of said substrate and being arranged in parallel spaced relation to one another, a printed dielectric layer on said substrate and said cathode strips and having a plurality of openings therethrough each communicating with a portion of said cathode strips, said openings being formed in rows and columns to form a matrix, said rows of openings each being aligned over one of said cathode strips, a transparent top plate having an under surface and sealed to the perimeter of said substrate by sealing means and positioned above and in spaced relation to said dielectric layer to create an envelope of space above, in communication with, and completely enveloping said matrix of openings;

a plurality of elongated anode strips mounted on the undersurface of said top plate within said envelope of space and in spaced relation to said dielectric layer, said anode strips extending perpendicular to and above said cathode strips and each being spaced above and in registered alignment with one of said columns in said matrix of openings in said dielectric layer, a mass of ionizable gas filling said envelope of space and said matrix of openings in said dielectric layer whereby said anode strips are all in direct contact with said mass of ionizable gas, said anode strips and said cathode strips being the only electrodes positioned in alignment with said matrix of openings, said envelope being substantially free of barriers between said rows and columns of openings, and terminal means for said anode and cathode strips;

said anode strips and said cathode strips each including a connection end extending outwardly from within said envelope to outside said envelope;

said substrate having first and second opposite ends and first and second opposite sides;

said cathode strips being divided into first and second cathode groups, said connection ends of said first cathode group being adjacent said first end of said substrate, and said connection ends of said second cathode group being adjacent said second end of said substrate;

said anode strips being divided into first and second anode groups, said connection ends of said first anode group being adjacent said first side of said substrate and said connection means of said second anode group being adjacent said second side of said substrate.

10. A device according to claim 9 wherein said terminal means comprising a plurality of anode pads mounted on said first and second sides of said substrate outside said envelope, connection means extending from said top glass to said substrate and providing electrical connection between said each of said connection ends of said anode strips and one of said anode pads.

11. A direct current dot matrix digital display device comprising:

a dielectric substrate having a flat upper surface, a plurality of elongated cathode strips mounted on the upper surface of said substrate and being arranged in parallel spaced relation to one another, a printed dielectric layer on said substrate and said cathode strips and having a plurality of openings therethrough each communicating with a portion of said cathode strips, said openings being formed in rows and columns to form a matrix, said rows of openings each being aligned over one of said cathode strips, a transparent top plate having an under surface and sealed to the perimeter of said substrate by sealing means and positioned above and in spaced relation to said dielectric layer to create an envelope of space above, in communication with, and completely enveloping said matrix of openings;

a plurality of elongated anode strips mounted on the undersurface of said top plate within said envelope of space and in spaced relation to said dielectric layer, said anode strips extending perpendicular to and above said cathode strips and each being spaced above and in registered alignment with one of said columns in said matrix of openings in said dielectric layer, a mass of ionizable gas filling said envelope of space and said matrix of openings in said dielectric layer whereby said anode strips are all in direct contact with said mass of ionizable gas, said anode strips and said cathode strips being the only electrodes positioned in alignment with said matrix of openings, said envelope being substantially free of barriers between said rows and column of openings, and terminal means for said anode and cathode strips;

said anode strips being transparent and said cathode strips being substantially longer than said anode strips.

12. A device according to claim 11 and further comprising anode driving means and cathode driving means for actuating said anode strips and said cathode strips respectively, control means connected to said anode and cathode driving means for causing sequential actuation of said cathode strips one at a time and for actuating preselected groups of said anode strips each time one of said cathode strips is actuated.

* * * * *

UNITED STATES PATENT AND TRADEMARK OFFICE

CERTIFICATE OF CORRECTION

PATENT NO. : RE. 33,520

DATED : Jan. 15, 1991

INVENTOR(S) : Herman R. Person

It is certified that error appears in the above-identified patent and that said Letters Patent is hereby corrected as shown below:

Col 8 lines 15 to 18, should be italicized.

Col 9 lines 30 to Col 10 line 3 should be italicized.

Signed and Sealed this

Twenty-third Day of April, 1991

*Attest:*

HARRY F. MANBECK, JR.

*Attesting Officer*

*Commissioner of Patents and Trademarks*

UNITED STATES PATENT AND TRADEMARK OFFICE

CERTIFICATE OF CORRECTION

PATENT NO. : Re. 33,520

DATED : January 15, 1991

INVENTOR(S) : Herman R. Person, et al

It is certified that error appears in the above-identified patent and that said Letters Patent is hereby corrected as shown below:

Cols. 7-14 should be deleted to appear as per attached Cols. 7-14.

This Certificate supercedes Certificate of Correction issued April 23, 1991.

Signed and Sealed this

Twenty-seventh Day of April, 1993

*Attest:*

MICHAEL K. KIRK

*Attesting Officer*

*Acting Commissioner of Patents and Trademarks*

UNITED STATES PATENT AND TRADEMARK OFFICE

CERTIFICATE OF CORRECTION

PATENT NO. : Re. 33,520

DATED : January 15, 1991

INVENTOR(S) : Herman R. Person, et al.

It is certified that error appears in the above-identified patent and that said Letters Patent is hereby corrected as shown below:

Columns 7-14, should be deleted to appear as per attached columns 7-14.

This certificate supercedes Certificate of Correction issued April 23, 1991

Signed and Sealed this

Seventeenth Day of August, 1993

*Attest:*

*Attesting Officer*

BRUCE LEHMAN

*Commissioner of Patents and Trademarks* ticular anodes should be actuated for the first cathode. This information is transmitted to the anode drivers designated by the numeral 58. Each anode driver 58 includes a clock input which is controlled by scan counter clock 60 and by the data transfer controller 62 so that the information from the random access memory is stored within each of the anode drivers 58. When all the information pertaining to the first cathode is stored in the anode drivers 58, the anode drivers 58 and the cathode driver 52 simultaneously actuate the first cathode and the particular preselected anodes which are desired to be actuated with the first cathode. This causes gas discharge glow adjacent the junctures between the actuated anodes and the first cathode. The scan counter and clock 60 then shuts off the cathodes and anodes and steps to a new address pertaining to the second cathode and to the combination of anodes which should be actuated with respect to that cathode. The address is transmitted to the random access memory 50 and the information is again inserted into anode drivers 58. Then anode drivers 58 and cathode drivers 52 are again actuated so that the second cathode is actuated and a second combination of anodes is also actuated. This process continues stepping through the cycle until all the cathodes and the anodes corresponding thereto have been actuated. The process repeats itself at a frequency which is not perceptible to the human eye, and the resulting effect is that the human eye perceives all of the gas discharge glows as being continuous, rather than intermittant.

The particular circuitry shown in FIG. 7 is illustrative of a circuit which can be used to produce the method of applicant's invention. Other circuitry could be used also without detracting from the invention. Listed below are an identification of the various components shown in the schematic diagram of FIG. 7.

| Component | Manufacturer Name and Address | Part Number |
|---|---|---|
| Cathode driver 52 | Sprague Electric Worcester, Mass. | ULN 2823A |
| Cathode Selector | RCA New York, N.Y. | CD 4514 BE |
| Address Selector 56 | Texas Instrument Dallas, Texas | SN 74157N |
| Random Access Memory 50 | National Semi-Conductor Santa Clara, C.A. | MM2102 |
| Anode Driver 58 | Texas Instruments Dallas, Texas | SN 75501A |

What is claimed is:

1. A direct current dot matrix digital display device comprising:

a dielectric substrate having a flat upper surface, a plurality of elongated cathode strips mounted on the upper surface of said substrate and being arranged in parallel spaced relation to one another, a printed dielectric layer on said substrate and said cathode strips and having a plurality of openings therethrough each communicating with a portion of said cathode strips, said openings being formed in rows and columns to form a matrix, [and] *said* rows of openings each being aligned over one of said [cathod] *cathode* strips, a transparent top plate having an under surface and sealed to the perimeter of said substrate by sealing means and positioned above and in spaced relation to said dielectric layer to create an envelope of space above, in communication with, and completely enveloping said matrix of openings;

a plurality of elongated anode strips mounted on the undersurface of said top plate within said envelope of space and in spaced relation to said dielectric layer, said anode strips extending perpendicular to and above said cathode strips and each being spaced above and in registered alignment with one of said columns in said matrix of openings in said dielectric layer,

*said dielectric layer covering all portions of said cathode strips and said upper surface of said substrate within said envelope between said matrix of openings;* a mass of ionizable gas filling said envelope of space and said matrix of openings in said dielectric layer whereby said anode strips are all in direct contact with said mass of ionizable gas, said anode strips and said cathode strips being the only electrodes positioned in alignment with said matrix of openings, said envelope being substantially free of barriers between said rows and column of openings, and terminal means for said anode and cathode strips.

2. A device according to claim 1 wherein said sealing means holds said top plate and said substrate spaced apart from one another a distance from 0.010 inches to 0.030 inches.

3. A device according to claim 1 wherein said ionizable gas within said envelope is under a pressure between 150 and 700 millimeters mercury.

4. A direct current dot matrix digital display device, comprising:

a dielectric substrate having a flat upper surface, a plurality of elongated cathode strips mounted on the upper surface of said substrate and being arranged in parallel spaced relation to one another, a printed dielectric layer on said substrate and said cathode strips and having a plurality of openings therethrough each communicating with a portion of said cathode strips, said openings being formed in rows and columns to form a matrix, said rows of openings each being aligned over one of said cathode strips, a transparent top plate having an under surface and sealed to the perimeter of said substrate by sealing means and positioned above and in spaced relation to said dielectric layer to create an envelope of space above, in communication with, and completely enveloping said matrix of openings;

a plurality of elongated anode strips mounted on the undersurface of said top plate within said envelope of space and in spaced relation to said dielectric layer, said anode strips extending perpendicular to and above said cathode strips and each being spaced above and in registered alignment with one of said columns in said matrix of openings in said dielectric layer, a mass of ionizable gas filling said envelope of space and said matrix of openings in said dielectric layer whereby said anode strips are all in direct contact with said mass of ionizable gas, said anode strips and said cathode strips being the only electrodes positioned in alignment with said matrix of openings, said envelope being substantially free of barriers between said rows and columns of openings, terminal means for said anode and cathode strips;

anode driving means connected to said anode strips for actuating said anode strips;

cathode driving means connected to said cathode strips for actuating said cathode strips;

random access memory means for storing information as to the selected anode strips and cathode strips to be actuated;

data transfer circuitry for intermittently transmitting data signals from said random access memory means to said anode and cathode driving means, said anode and cathode driving means being responsive to receipt of each of said data signals to cause first, a simultaneous actuation of one of said cathode strips and a corresponding group of said anode strips for causing a glow at those of said openings in said matrix which are located at the intersection of said actuated cathode and anode strips, and second, a complete deactuation of all of said cathode and anode strips for causing a cessation of glow; each of said signals causing simultaneous actuation of a different cathode strip and a different group of anode strips;

control means connected to said data transfer means for causing said data transfer means to transfer data signals one at a time from said random access memory means for actuating each of said cathodes and a corresponding group of anodes one at a time in a sequence which permits all of said cathode strips to be actuated and then for repeating said sequences of signals at a frequency imperceptible to the human eye whereby the intermittent glow from said actuated anode and cathode strips will appear to be continuous.

*5. A direct current dot matrix digital display device comprising:*

*a dielectric substrate having a flat upper surface,*

*a plurality of elongated cathode strips mounted on the upper surface of said substrate and being arranged in parallel spaced relation to one another,*

*a printed dielectric layer on said substrate and said cathode strips and having a plurality of openings therethrough each communicating with a portion of said cathode strips, said openings being formed in rows and columns to form a matrix, said rows of openings each being aligned over one of said cathode strips,*

*a transparent top plate having an under surface and sealed to the perimeter of said substrate by sealing means and positioned above and in spaced relation to said dielectric layer to create an envelope of space above, in communication with, and completely enveloping said matrix of openings;*

*a plurality of elongated anode strips mounted on the undersurface of said top plate within said envelope of space and in spaced relation to said dielectric layer, said anode strips extending perpendicular to and above said cathode strips and each being spaced above and in registered alignment with one of said columns in said matrix of openings in said dielectric layer,*

*a mass of ionizable gas filling said envelope of space and said matrix of openings in said dielectric layer whereby said anode strips are all in direct contact with said mass of ionizable gas,*

*said anode strips and said cathode strips being the only electrodes positioned in alignment with said matrix of openings,*

*said envelope being substantially free of barriers between said rows and column of openings, and*

*terminal means for said anode and cathode strips;*

*said terminal means comprising a plurality of anode pads and a plurality of cathode pads mounted on said substrate, and connection means connected to each of said anode strips and extending from each of said anode strips into electrical connection with one of said anode pads on said substrate.*

*6. A direct current dot matrix digital display device comprising:*

*a dielectric substrate having a flat upper surface,*

*a plurality of elongated cathode strips mounted on the upper surface of said substrate and being arranged in parallel spaced relation to one another,*

*a printed dielectric layer on said substrate and said cathode strips and having a plurality of openings therethrough each communicating with a portion of said cathode strips, said openings being formed in rows and columns to form a matrix, said rows of openings each being aligned over one of said cathode strips,*

*a transparent top plate having an under surface and sealed to the perimeter of said substrate by sealing means and positioned above and in spaced relation to said dielectric layer to create an envelope of space above, in communication with, and completely enveloping said matrix of openings;*

*a plurality of elongated anode strips mounted on the undersurface of said top plate within said envelope of space and in spaced relation to said dielectric layer, said anode strips extending perpendicular to and above said cathode strips and each being spaced above and in registered alignment with one of said columns in said matrix of openings in said dielectric layer,*

*a mass of ionizable gas filling said envelope of space and said matrix of openings in said dielectric layer whereby said anode strips are all in direct contact with said mass of ionizable gas,*

*said anode strips and said cathode strips being the only electrodes positioned in alignment with said matrix of openings,*

*said envelope being substantially free of barriers between said rows and column of openings, and*

*terminal means for said anode and cathode strips;*

*said ionizable gas within said envelope being under a pressure between* 150 and 700 millimeter mercury.

*7. A direct current dot matrix digital display device comprising:*

*a dielectric substrate having a flat upper surface,*

*a plurality of elongated cathode strips mounted on the upper surface of said substrate and being arranged in parallel spaced relation to one another,*

*a printed dielectric layer on said substrate and said cathode strips and having a plurality of openings therethrough each communicating with a portion of said cathode strips, said openings being formed in rows and columns to form a matrix, said rows of openings each being aligned over one of said cathode strips,*

*a transparent top plate having an under surface and sealed to the perimeter of said substrate by sealing means and positioned above and in spaced relation to said dielectric layer to create an envelope of space above, in communication with, and completely enveloping said matrix of openings;*

*a plurality of elongated anode strips mounted on the undersurface of said top plate within said envelope of space and in spaced relation to said dielectric layer, said anode strips extending perpendicular to and above said cathode strips and each being spaced above and in registered alignment with one of said columns in said matrix of openings in said dielectric layer,*

*a mass of ionizable gas filling said envelope of space and said matrix of openings in said dielectric layer whereby said anode strips are all in direct contact with said mass of ionizable gas,*

*said anode strips and said cathode strips being the only electrodes positioned in alignment with said matrix of openings,*

*said envelope being substantially free of barriers between said rows and column of openings, and*

*terminal means for said anode and cathode strips;*

*said envelope having mercury introduced therein for retarding sputtering of said cathodes.*

*8. A direct current dot matrix digital display device comprising:*

*a dielectric substrate having a flat upper surface,*

*a plurality of elongated cathode strips mounted on the upper surface of said substrate and being arranged in parallel spaced relation to one another,*

*a printed dielectric layer on said substrate and said cathode strips and having a plurality of openings therethrough each communicating with a portion of said cathode strips, said openings being formed in rows and columns to form a matrix, said rows of openings each being aligned over one of said cathode strips,*

*a transparent top plate having an under surface and sealed to the perimeter of said substrate by sealing means and positioned above and in spaced relation to said dielectric layer to create an envelope of space above, in communication with, and completely enveloping said matrix of openings;*

*a plurality of elongated anode strips mounted on the undersurface of said top plate within said envelope of space and in spaced relation to said dielectric layer, said anode strips extending perpendicular to and above said cathode strips and each being spaced above and in registered alignment with one of said columns in said matrix of openings in said dielectric layer,*

*a mass of ionizable gas filling said envelope of space and said matrix of openings in said dielectric layer whereby said anode strips are all in direct contact with said mass of ionizable gas,*

*said anode strips and said cathode strips being the only electrodes positioned in alignment with said matrix of openings,*

*said envelope being substantially free of barriers between said rows and columns of openings, and*

*terminal means for said anode and cathode strips;*

*keep alive means within said envelope comprising an opaque keep alive anode on said undersurface of said top plate and a keep alive cathode on said uppersurface of said substrate.*

*9. A direct current dot matrix digital display device comprising:*

*a dielectric substrate having a flat upper surface,*

*a plurality of elongated cathode strips mounted on the upper surface of said substrate and being arranged in parallel spaced relation to one another,*

*a printed dielectric layer on said substrate and said cathode strips and having a plurality of openings therethrough each communicating with a portion of said cathode strips, said openings being formed in rows and columns to form a matrix, said rows of openings each being aligned over one of said cathode strips,*

*a transparent top plate having an under surface and sealed to the perimeter of said substrate by sealing means and positioned above and in spaced relation to said dielectric layer to create an envelope of space above, in communication with, and completely enveloping said matrix of openings;*

*a plurality of elongated anode strips mounted on the undersurface of said top plate within said envelope of space and in spaced relation to said dielectric layer, said anode strips extending perpendicular to and above said cathode strips and each being spaced above and in registered alignment with one of said columns in said matrix of openings in said dielectric layer,*

*a mass of ionizable gas filling said envelope of space and said matrix of openings in said dielectric layer whereby said anode strips are all in direct contact with said mass of ionizable gas,*

*said anode strips and said cathode strips being the only electrodes positioned in alignment with said matrix of openings,*

*said envelope being substantially free of barriers between said rows and columns of openings, and*

*terminal means for said anode and cathode strips;*

*said anode strips and said cathode strips each including a connection end extending outwardly from within said envelope to outside said envelope;*

*said substrate having first and second opposite ends and first and second opposite sides;*

*said cathode strips being divided into first and second cathode groups, said connection ends of said first cathode group being adjacent said first end of said substrate, and said connection ends of said second cathode group being adjacent said second end of said substrate;*

*said anode strips being divided into first and second anode groups, said connection ends of said first anode group being adjacent said first side of said substrate and said connection means of said second anode group being adjacent said second side of said substrate.*

*10. A device according to claim 9 wherein said terminal means comprising a plurality of anode pads mounted on said first and second sides of said substrate outside said envelope, connection means extending from said top glass to said substrate and providing electrical connection between said each of said connection ends of said anode strips and one of said anode pads.*

*11. A direct current dot matrix digital display device comprising:*

*a dielectric substrate having a flat upper surface,*

*a plurality of elongated cathode strips mounted on the upper surface of said substrate and being arranged in parallel spaced relation to one another,*

*a printed dielectric layer on said substrate and said cathode strips and having a plurality of openings therethrough each communicating with a portion of said cathode strips, said openings being formed in rows and columns to form a matrix, said rows of openings each being aligned over one of said cathode strips,*

*a transparent top plate having an under surface and sealed to the perimeter of said substrate by sealing means and positioned above and in spaced relation to said dielectric layer to create an envelope of space above, in communication with, and completely enveloping said matrix of openings;*

*a plurality of elongated anode strips mounted on the undersurface of said top plate within said envelope of space and in spaced relation to said dielectric layer, said anode strips extending perpendicular to and above said cathode strips and each being spaced above and in registered alignment with one of said columns in said matrix of openings in said dielectric layer,*

*a mass of ionizable gas filling said envelope of space and said matrix of openings in said dielectric layer whereby said anode strips are all in direct contact with said mass of ionizable gas,*

*said anode strips and said cathode strips being the only electrodes positioned in alignment with said matrix of openings,*

*said envelope being substantially free of barriers between said rows and column of openings, and*

*terminal means for said anode and cathode strips;*

*said anode strips being transparent and said cathode strips being substantially longer than said anode strips.*

*12. A device according to claim 11 and further comprising anode driving means and cathode driving means for actuating said anode strips and said cathode strips respectively, control means connected to said anode and cathode driving means for causing sequential actuation of said cathode strips one at a time and for actuating preselected groups of said anode strips each time one of said cathode strips is actuated.*

* * * * *